2,951,048
Patented Aug. 30, 1960

2,951,048
THERMOSETTING COATING COMPOSITIONS

Samuel Gusman, Wyncote, Pa., and Anton W. Rytina, Coshocton, Ohio, assignors to Rohm & Haas Company, Philadelphia, Pa., a corporation of Delaware No Drawing. Filed Feb. 18, 1957, Ser. No. 640,588

9 Claims. (Cl. 260—21)

The present invention is concerned with new triazine resins and coating compositions comprising them which produce films and coatings having outstanding characteristics, especially in respect to outdoor durability.

In accordance with the present invention, it has been discovered that a butylated N-t-octylmelamine-formaldehyde condensate obtained from the butylation of the methylol condensate formed from a mixture in which the ratio of formaldehyde to the triazine is from 1.5 to 2.5 moles of the former per mole of the latter, the ratio of butyl alcohol to triazine being at least 3 moles to 1 mole, there being preferably enough of the alcohol to completely etherify all of the methylol units, contributes to films containing it outstanding resistance to weathering as compared to films made in a similar manner but containing instead previously used triazine condensates.

The condensate of the present invention is normally obtained as a solution thereof in an organic solvent system which may contain butanol. This condensate system has excellent stability, particularly with respect to viscosity. Furthermore, the condensate attains the necessary viscosity for good film-formation with the low formaldehyde ratio mentioned hereinabove, whereas in the alkylated polymethylol triazines heretofore available, it has generally been necessary to provide a molar ratio of formaldehyde to triazine of at least 3:1 to provide the necessary viscosity, ratios of 4.5 to 6 or 8 moles of formaldehyde to one of the triazine being quite common.

The condensates of the present invention are also characterized by outstanding solubility in a wide variety of solvents and outstanding compatibility with other resins, and especially with alkyds. They can thus provide valuable coating compositions by being mixed, or partially coreacted, with alkyds and the films and coatings obtained from their mixtures or combinations with alkyds have the outstanding outdoor durability mentioned above. The coatings thereby obtained have good adhesion when applied directly to metals, and especially steel. The coatings may also be applied to ceramics, glass, wood, and paper or to metals or other substrates carrying primers, anchor coatings, or other sub-coatings thereon. The coatings also are hard and yet have excellent flexibility and impact resistance. In general, the optimum combination of these properties are obtained from condensates from a mixture of 1.9 to 2 moles of formaldehyde per mole of the triazine and at least 3 moles of n-butanol per mole of triazine.

The N-t-octylmelamine used in the present invention has the Formula I:

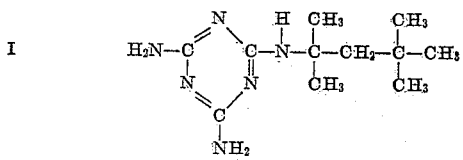

It may be prepared as follows:

A mixture of 38.5 parts (0.25 mole) of dimethylneopentylcarbinylcyanamide (t-octylcyanamide), 21 parts (0.25 mole) of dicyandiamide, 40 parts of n-butanol, and 1.4 parts of powdered potassium hydroxide is stirred and refluxed for two hours at which time a second portion of 1.4 parts of powdered potassium hydroxide is added and the refluxing is continued for two more hours. The mixture is cooled and diluted with 50 parts of methanol and allowed to stand overnight. The precipitate which formed is filtered off, washed with 250 parts of boiling water, and dried. The dried product of Formula I (25 parts) is then crystallized from ethylene dichloride. It has a melting point of 160° to 162° C.

The condensate of the present invention may be prepared by first reacting at a pH between 6 and 8, preferably about 7.5, a mixture of aqueous formaldehyde, paraformaldehyde, or other derivative revertible to free formaldehyde, with the N-t-octylmelamine dissolved in an organic solvent, such as n-butanol, isopropanol, sec-butanol, or isobutanol, or a mixture of such alcohols, or a mixture of one or more of the alcohols with an aromatic hydrocarbon, such as toluene or xylene. The reaction is effected at temperatures of 40° C. to refluxing temperature. After methylolation is thereby effected, some water being preferably removed by refluxing during the reaction, the pH is lowered to a value between 4 and 5, preferably to about 4.5, by the addition of an acid. This acidification may be preceded by a cooling step to avoid excessive violence on heating. Generally, the reaction mixture becomes clear during the methylolation prior to acidification. Heating, and preferably refluxing with removal of additional water, is or are again carried out on the reaction mixture (the alcohol, such as butyl alcohol, being added if insufficient is already present). The alkylation is thereby carried out at a temperature of 95° to 125° C. over a period of several hours, such as 3 to 6 hours. The condensate may be concentrated by distillation, diluted with additional organic solvent, such as butyl alcohol, toluene or xylene, and/or, if desired, filtered.

When an alkyd is mixed with the aminoplast condensate of the present invention, the latter may amount to 5 to 30% of the total weight of alkyd plus aminoplast. The aminoplast, whether used with or without an alkyd may be "catalyzed" by the addition of about ½ to 8%, on the weight of the aminoplast, of an acidic curing catalyst, such as p-toluenesulfonic acid, sulfuric acid, hydrochloric acid, phosphoric acid, oxalic acid, halogenoacetic acids, such as α-bromo- or α-chloroacetic acid, half-esters of dicarboxylic acids such as oxalic or maleic acids, with an alcohol such as butanol, e.g. butyl acid phthalate, and amine salts of mono- and poly-carboxylic acids, such as the triethylamine monosalt of maleic acid. This addition of catalyst may be effected before or after mixture with an alkyd. The addition of catalyst is frequently unnecessary as adequate residual acid or inherent acidity is commonly present in either the aminoplast condensate or the alkyd.

Depending upon the particular method of application, the concentration of the film-forming component or components (i.e. binder exclusive of pigment) of the composition may vary widely. For example, the solution of the aminoplast (which solution may or may not contain an alkyd or other film-forming component) may contain from 1 to about 50% by weight of aminoplast (or of aminoplast and alkyd or other film-forming component, if an alkyd or other film-forming component is present) for coating purposes. The aminoplast compositions with or without another film-forming component, such as an alkyd, therein may be applied by spraying, dipping, brushing, roll-transfer, or in any other suitable manner.

After application of the composition to a surface, it may be allowed to dry by exposure to normal atmospheric air currents. Alternatively, it may be dried by application of heated air, by application of infrared rays, radio frequency currents, or in any other suitable manner. After drying or during drying, curing is effected by heating to a temperature of about 200° to 400° F. or higher for a period of time that generally is inversely proportional to the temperature and may be from about 30 seconds to an hour or so. The combined factors of temperature and time depend, among other things as well, upon the particular solvent used and the thickness of coating.

The compositions may be pigmented if clear coatings are not desired. For this purpose, there may be incorporated into the composition an amount of pigment, extender, filler, delustrant, or the like, such that the weight ratio of binder solids (including the aminoplast and alkyd or other film-former, if used) to pigment is from 25:1 to 1:20, depending upon the particular effect desired. For most purposes when outdoor durability is desired and an alkyd is used, the ratio of binder to pigment may be about 20:1 when a black is desired or from 1:1 to 7:1 for most other colors. Any pigments may be employed including titanium dioxide, copper phthalocyanine, ultramarine blue, lead chromate, barium sulfate, zinc chromate, carbon black, and so on.

The alkyds that may be used in conjunction with the catalyzed aminoplast of the present invention include simple condensates of dicarboxylic acids with glycols as well as more complex polyesters obtained by the condensation of dicarboxylic acids with polyols which may or may not be modified with a fatty acid or fatty acids. The dicarboxylic acids that may be used include phthalic, succinic, adipic, or sebacic acids. The glycols that may be used include ethylene glycol, diethylene glycol, propylene glycol, dipropylene glycol, and trimethylene glycol. The oil-modified alkyds that may be used include those obtained by condensing one of the above-mentioned dicarboxylic acids with a polyhydric alcohol which may comprise 25 to 100% by weight of at least one alcohol containing at least three hydroxyl groups, such as glycerol, trimethylolethane, trimethylolpropane, pentaerythritol, sorbitol, mannitol, dulcitol, or inositol, modified with a fatty acid or fatty acid mixture derived from drying, semi-drying, or non-drying oils or fats, the fatty acid having from 12 to 30 carbon atoms and up. The dicarboxylic acids mentioned may also be mixed with a small proportion of maleic acid, such as up to 10 or 15% on the weight of the total dicarboxylic acid. All or part of the polyhydric alcohol may consist of a dihydric alcohol, such as ethylene glycol, diethylene glycol, propylene glycol, dipropylene glycol, and trimethylene glycol or a mixture thereof. The modifying fatty acid may be lauric acid, myristic acid, coconut oil fatty acids, palm oil fatty acids, palmitic acid, oleic acid, stearic acid, linolenic acid, and fatty acids obtained by hydrogenaton of fish, animal, or vegetable oils or fats. In preparing the oil-modified alkyd, the glycerol or other polyhydric alcohol or mixture thereof may first be partially esterified with the monoacid or mixture thereof, and the resulting partial ester may then be reacted with the dicarboxylic acid, such as phthalic acid. Alternatively, the dicarboxylic acid, the polyhydric alcohol and the monocarboxylic acids may be mixed together and reacted simultaneously. It is preferred to use alkyds modified with essentially saturated, non-drying fatty acids to assure freedom from yellowing and embrittlement on ageing. Preferred alkyds may be obtained from 39% to 50% phthalic acid, 20% to 30% glycerol, and 30% to 35% saturated or unsaturated higher fatty acids. The preparation of the alkyd is in itself no part of the present invention, since conventional oil-modified alkyds may be used.

The coatings may be applied to all sorts of surfaces for a wide variety of purposes. They are particularly desirable for application to primed surfaces of metals, such as iron, steel, copper, brass, aluminum, chromium, nickel, and the like; to glass, porcelain and other vitreous materials; to articles made of plastic materials; wood, textile fabrics, leather, paper, cardboard, and so on.

In the following examples, which are illustrative of the invention, the parts and percentages are by weight unless otherwise indicated:

*Example 1*

(a) To a 2-1. 3-necked flask fitted with a stirrer, thermometer, automatic water separator (filled with a 50/50 mixture of water and xylene) and reflux condenser were charged:

| | |
|---|---|
| T-octylmelamine | 286 g. (1.2 moles). |
| 35.6% aqueous formaldehyde | 196 g. (2.32 moles). |
| N-butanol | 355 g. (4.8 moles). |
| Xylene | 57 g. |

The pH of the mixture was raised to 7.4 to 7.6 (bromothymol blue) by addition of 0.4 ml. of 25% aqueous sodium hydroxide. The reaction mixture was heated to reflux (94° C.) and 50 ml. of water was removed azeotropically at 94° to 96° C. During this period the reaction mixture became clear. Next, the resin solution was cooled to 90° C. and the pH was lowered to 4.4 to 4.6 (bromocresol green) by the addition of 2.7 ml. of 50% aqueous formic acid solution. Heating and removal of water was resumed until separation of water had ceased; a total of 121 cc. of water was obtained during 4½ hours. The temperature range during this period was 95° to 120° C. There was added to the resin 286 grams of n-butanol and 286 grams of distillate was removed at a temperature range of 117° to 123° C. At this point, 700 grams of resin solution having a solids content of 60.6% remained.

The resin solution was concentrated to 75% solids by the distillation of 134 grams of solvent (123° to 130° C.) and diluted to 60% solids by the addition of 144 grams of xylene. After cooling to 50° C., the resin solution was filtered by suction through a pad of Super-Cel to yield 698 grams of resin having the following physical properties:

| | |
|---|---|
| Percent solids (uncatalyzed) | 60.1 |
| Percent solids (catalyzed) [1] | 58.0 |
| Viscosity (25° C.) (Gardner-Holdt) | I |
| Mineral thinner tolerance>125 ml./10 g. Resin sol'n. | |
| Isoöctane tolerance>125 ml./10 g. Resin sol'n. | |
| Color (Varnish Color Scale) | 1— |
| Acid No. | 2.4 |

[1] 4% of butyl acid phthalate (solids basis).

*Example 2*

(a) The procedure of Example 1(a) is repeated raising the proportion of formaldehyde to 2.4 moles thereof per mole of N-t-octylmelamine.

(b) The procedure of Example 1(a) is repeated raising the proportion of n-butanol to 5 moles per mole of the triazine.

(c) The procedure of part (a) hereof is repeated raising the proportion of n-butanol to 5 moles per mole of the triazine.

(d) The procedure of part (a) hereof is repeated reducing the proportion of n-butanol to 3.2 moles per mole of the triazine.

*Example 3*

(a) The procedure of Example 1(a) is repeated except that the proportion of n-butanol is reduced to 3.2 moles per mole of triazine.

(b) The procedure of Example 1(a) is repeated except that the proportion of formaldehyde is reduced to 1.6 moles per mole of triazine.

(c) The procedure of Example 1(a) is repeated except that the proportion of formaldehyde is reduced to 1.6 moles per mole of triazine and the proportion of n-butanol is reduced to 3.2 moles per mole of triazine.

(d) The procedure of Example 1(a) is repeated except that the proportion of formaldehyde is reduced to 1.6 moles per mole of triazine and the proportion of n-butanol is raised to 5 moles per mole of triazine.

Example 4

Thermosetting coating compositions are made up of a pigment mixture comprising 1.5 parts carbon black, 3.5 parts Prussian Blue, 5 parts titanium dioxide and 90 parts of chrome green and a vehicle comprising (1) 753 parts of a solution in xylol of 452 parts of a cottonseed oil-modified glycerol-phthalic anhydride alkyd and (2) 188 parts of the 60% aminoplast solution of Example 1. This composition is reduced with xylol to a viscosity of 21 seconds (No. 4 Ford cup) for spraying. The pigmented dispersions are sprayed on bonderized steel panels and baked for 30 minutes at 250° F. The coatings adhere well and show improved durability on outdoor exposure as compared to similar compositions containing conventionally available butylated polymethylol melamines having at least three moles combined formaldehyde per mole of melamine.

Example 5

(a) A thermosetting coating composition comprising (1) 50 parts of titanium dioxide, (2) 58.3 parts of a solution in xylol of 35 parts of an oil-modified alkyd prepared from 47% phthalic anhydride, 34% glycerol, and 19% of coconut fatty acids, and (3) 25 parts of the 60% solution of the butylated condensate of Example 1 is reduced with xylol to a viscosity of 21 seconds (No. 4 Ford cup) for spraying. The diluted solution is spray-coated on steel panels, dried and then baked at 300° F. for 30 minutes.

(b) Coated substrates are obtained by repeating part (a) hereof several times, applying the compositions to different panels, except that in the first repetition the butylated condensate of Example 1 is replaced by the same amount of the condensate obtained in Example 2(a); in the second repetition the condensate of Example 1 is replaced with the condensate of Example 2(b); in the third, with the condensate of Example 2(c); in the fourth, with the condensate of Example 2(d); in the fifth, with the condensate of Example 3(a); in the sixth, with the condensate of Example 3(b); and in the seventh, with the condensate of Example 3(c).

The coatings are hard, adhere well to the substrates, have good resistance to impact, and have good gloss retention and durability when exposed to normal weather conditions.

(c) Coatings are similarly obtained from a composition defined in part (a) except that 15 parts of ½-second nitrocellulose is added thereto.

The aminoplast condensates of the present invention may also be combined with nitrocellulose or other resins alone or in admixture with alkyds.

It is to be understood that changes and variations may be made without departing from the spirit and scope of the invention as defined in the appended claims.

We claim:

1. A composition comprising the butylated condensation product of a mixture of formaldehyde and N-t-octylmelamine of the formula

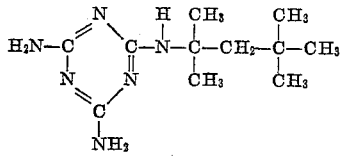

in the ratio of 1.5 to 2.5 moles of the formaldehyde per mole of the melamine, the butylated product being the reaction product of a mixture containing at least 3 moles of n-butyl alcohol per mole of the melamine/formaldehyde condensation product.

2. A composition comprising the butylated condensation product of a mixture of formaldehyde and N-t-octylmelamine of the formula

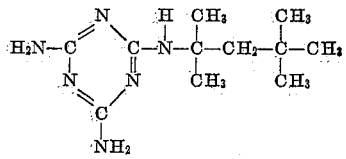

in the ratio of about 1.9 moles of the formaldehyde per mole of the melamine, the butylated product being the reaction product of a mixture containing at least 3 moles of n-butyl alcohol per mole of the melamine/formaldehyde condensation product.

3. A composition comprising the butylated condensation product of a mixture of formaldehyde and N-t-octylmelamine of the formula

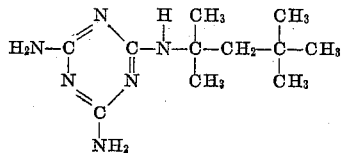

in the ratio of about 1.9 moles of the formaldehyde per mole of the melamine, the butylated product being the reaction product of a mixture containing about 4 moles of n-butyl alcohol per mole of the melamine/formaldehyde condensation product.

4. A composition comprising (1) about 5 to 30% by weight of a butylated condensation product of a mixture of formaldehyde and N-t-octylmelamine of the formula

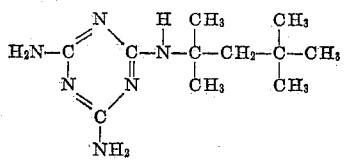

in the ratio of 1.5 to 2.5 moles of the formaldehyde per mole of the melamine, the butylated product being the reaction product of a mixture containing at least 3 moles of n-butyl alcohol per mole of the melamine/formaldehyde condensation product and (2) about 70 to 95% of a polyester selected from the group consisting of condensates of (a) a dicarboxylic acid selected from the group consisting of phthalic, succinic, adipic, and sebacic acids, mixtures thereof and mixtures of any of said acids with maleic acid in which the maleic acid concentration is up to 15% by weight with (b) at least one aliphatic polyol selected from the group consisting of ethylene glycol, diethylene glycol, propylene glycol, dipropylene glycol, trimethylene glycol, glycerol, trimethylolethane, trimethylolpropane, pentaerythritol, sorbitol, mannitol, dulcitol, and inositol, and such condensates modified by a fatty acid having 12 to 30 carbon atoms.

5. A composition as defined in claim 4 in which the polyester is a glycerol/phthalic anhydride polyester modified by cottonseed oil fatty acids.

6. A composition as defined in claim 4 in which the polyester is a glycerol/phthalic anhydride polyester modified by coconut oil fatty acids.

7. A composition comprising (1) about 10 to 25% by weight of a butylated condensation product of a mixture of formaldehyde and N-t-octylmelamine of the formula

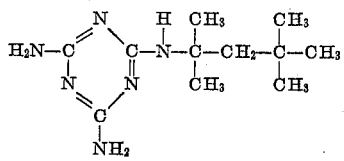

in the ratio of 1.5 to 2.5 moles of the formaldehyde per mole of the melamine, the butylated product being the reaction product of a mixture containing at least 3 moles of n-butyl alcohol per mole of the melamine/ formaldehyde condensation product and (2) about 75 to 90% of a polyester selected from the group consisting of condensates of (a) a dicarboxylic acid selected from the group consisting of phthalic, succinic, adipic, and sebacic acids, mixtures thereof and mixtures of any of said acids with maleic acid in which the maleic acid concentration is up to 15% by weight with (b) at least one aliphatic polyol selected from the group consisting of ethylene glycol, diethylene glycol, propylene glycol, dipropylene glycol, trimethylene glycol, glycerol, trimethylolethane, trimethylolpropane, pentaerythritol, sorbitol, mannitol, dulcitol, and inositol, and such condensates modified by a fatty acid having 12 to 30 carbon atoms.

8. A composition comprising (1) about 5 to 30% by weight of a butylated condensation product of a mixture of formaldehyde and N-t-octylmelamine of the formula

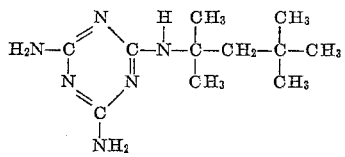

in the ratio of about 1.9 moles of the formaldehyde per mole of the melamine, the butylated product being the reaction product of a mixture containing at least 3 moles of n-butyl alcohol per mole of the melamine/formaldehyde condensation product and (2) about 70 to 95% of a polyester selected from the group consisting of condensates of (a) a dicarboxylic acid selected from the group consisting of phthalic, succinic, adipic, and sebacic acids, mixtures thereof and mixtures of any of said acids with maleic acid in which the maleic acid concentration is up to 15% by weight with (b) at least one aliphatic polyol selected from the group consisting of ethylene glycol, diethylene glycol, propylene glycol, dipropylene glycol, trimethylene glycol, glycerol, trimethylolethane, trimethylolpropane, pentaerythritol, sorbitol, mannitol, dulcitol, and inositol, and such condensates modified by a fatty acid having 12 to 30 carbon atoms.

9. A composition comprising (1) about 5 to 30% by weight of a butylated condensation product of a mixture of formaldehyde and N-t-octylmelamine of the formula

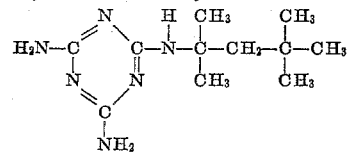

in the ratio of about 1.9 moles of the formaldehyde per mole of the melamine, the butylated product being the reaction product of a mixture containing about 4 moles of n-butyl alcohol per mole of the melamine/formaldehyde condensation product and (2) about 70 to 95% of a polyester selected from the group consisting of condensates of (a) a dicarboxylic acid selected from the group consisting of phthalic, succinic, adipic, and sebacic acids, mixtures thereof and mixtures of any of said acids with maleic acid in which the maleic acid concentration is up to 15% by weight with (b) at least one aliphatic polyol selected from the group consisting of ethylene glycol, diethylene glycol, propylene glycol, dipropylene glycol, trimethylene glycol, glycerol, trimethylolethane, trimethylolpropane, pentaerythritol, sorbitol, mannitol, dulcitol, and inositol, and such condensates modified by a fatty acid having 12 to 30 carbon atoms.

References Cited in the file of this patent

UNITED STATES PATENTS

| | | |
|---|---|---|
| 2,197,357 | Widmer et al. | Apr. 16, 1940 |
| 2,259,980 | West et al. | Oct. 21, 1941 |
| 2,294,590 | West | Sept. 1, 1942 |
| 2,508,876 | Scott et al. | May 23, 1950 |
| 2,628,234 | Bortnick | Feb. 10, 1953 |
| 2,648,642 | Spencer | Aug. 11, 1953 |
| 2,649,423 | Spencer | Aug. 18, 1953 |
| 2,653,143 | De Benneville et al. | Sept. 22, 1953 |

OTHER REFERENCES

Thurmond: Official Digest, p. 381–8, May 1950.

Payne: Organic Coating Technology, p. 334–350, John Wiley (1954).